(12) United States Patent
Lovesy

(10) Patent No.: US 6,543,145 B2
(45) Date of Patent: Apr. 8, 2003

(54) WHEEL ALIGNMENT APPARATUS

(75) Inventor: Robert Lovesy, Southampton (GB)

(73) Assignee: Supertracker Limited, Southampton (GB)

( * ) Notice: Subject to any disclaimer, the term of this patent is extended or adjusted under 35 U.S.C. 154(b) by 50 days.

(21) Appl. No.: 09/769,237

(22) Filed: Jan. 24, 2001

(65) Prior Publication Data

US 2001/0009070 A1 Jul. 26, 2001

(30) Foreign Application Priority Data

Jan. 25, 2000 (GB) .............................................. 0001509

(51) Int. Cl.$^7$ .......................... G01B 5/255; G01B 21/00
(52) U.S. Cl. ............................. 33/203; 33/645; 33/533; 33/288; 33/203.18
(58) Field of Search .................... 33/645, 533, 203, 33/288, 286, 203.18, 203.19, 203.2, DIG. 21, 203.12–203.17

(56) References Cited

U.S. PATENT DOCUMENTS

| | | | | |
|---|---|---|---|---|
| 3,758,958 A | * | 9/1973 | Jordan ............................. 33/336 |
| 3,901,604 A | * | 8/1975 | Butler ......................... 250/237 R |
| 4,015,339 A | | 4/1977 | Hörvallius |
| 4,150,897 A | * | 4/1979 | Roberts, Jr. et al. ...... 250/237.6 |
| 4,349,965 A | * | 9/1982 | Alsina ............................ 33/288 |
| 4,598,481 A | * | 7/1986 | Donahue ........................ 33/288 |
| 4,630,379 A | | 12/1986 | Wickmann et al. |
| 4,898,464 A | * | 2/1990 | Thorne et al. ................ 356/152 |
| 5,029,397 A | | 7/1991 | Palombi |
| 5,208,647 A | * | 5/1993 | Longa et al. ................. 356/152 |
| 5,532,816 A | * | 7/1996 | Spann et al. ............. 356/139.09 |
| 5,535,522 A | * | 7/1996 | Jackson .......................... 33/288 |
| 5,598,358 A | * | 1/1997 | Gender et al. ........... 264/571.01 |
| 5,684,578 A | * | 11/1997 | Nower et al. ............... 356/141.3 |
| 5,724,743 A | * | 3/1998 | Jackson .......................... 33/288 |
| 5,842,281 A | * | 12/1998 | Mieling .................... 33/203.18 |
| 5,870,315 A | * | 2/1999 | January ................... 364/528.14 |
| 5,886,782 A | * | 3/1999 | Hedgecock, Jr. ............. 356/155 |
| 6,240,648 B1 | * | 6/2001 | Dolph ...................... 33/203.18 |
| 2001/0022655 A1 | * | 9/2001 | Stieff ..................... 356/136.09 |

FOREIGN PATENT DOCUMENTS

| | | |
|---|---|---|
| DE | 3434391 | 4/1986 |
| DE | 3807577 | 9/1989 |
| DE | 19810140 | 9/1999 |
| DE | 19812911 | 10/1999 |
| EP | 0491369 | 12/1991 |
| EP | 0945333 | 3/1999 |

* cited by examiner

*Primary Examiner*—Diego Gutierrez
*Assistant Examiner*—Gail Verbitsky
(74) *Attorney, Agent, or Firm*—Ware, Fressola, Van Der Sluys & Adolphson

(57) ABSTRACT

Apparatus for measuring vehicle wheel alignment comprising a yoke having a pair of aligned center pins engageable with a transverse axis in the vehicle; a collimated beam projector connectable to the yoke and adapted to project its beam at right angles to the axis of the center pins, and longitudinally of the vehicle with reference to the transverse axis and a target for the beam so attachable to a wheel of the vehicle that alignment of the wheel can be measured. In one embodiment the target is a mirror and the projector is provided with a transverse scale for measuring the reflected beam. In the other embodiment the target comprises a set of scales hung or clamped to the wheel.

9 Claims, 3 Drawing Sheets

WHEEL ALIGNMENT APPARATUS

The present invention relates to an apparatus for measuring alignment of vehicle wheels, particularly, though not exclusively, of bicycles.

In a chain driven motor cycle, it is essential that the rear axle sprocket be aligned with the gearbox output sprocket. It is also desirable to be able to check front to rear wheel alignment when the front wheel is steered straight ahead.

The object of the present invention is to provide an apparatus with which these alignments can be checked with reference to the rear forks/swinging arm pivot, i.e. the axis about which the rear suspension link carrying the rear wheel is pivoted in the frame of the motor cycle.

According to the invention there is provided an apparatus for measuring vehicle wheel alignment comprising:
- a yoke having a pair of aligned center pins engageable with a transverse axis in the vehicle
- a collimated beam projector connectable to the yoke and adapted to project its beam at right angles to the axis of the center pins, and longitudinally of the vehicle with reference to the transverse axis and
- a target for the beam so attachable to a wheel of the vehicle that alignment of the wheel can be measured.

It can be envisaged that the target is a reflector, having a mirror or the like arranged at right angles to the wheel, that is parallel to the axis of the wheel, for reflecting the beam back to the projector. When the wheel is aligned correctly the beam is reflected back along its projection plane. To detect this the projector can be provided with a transverse scale.

However, the preferred embodiment is simpler in that the target includes means for visualizing whether the projected beam is passing the parallel with the wheel. Conventionally, the visualization means comprise a set of scale lines on a plate having abutments adapted to cause the lines to be parallel to the wheel. The plate can be clamped to or hung on the wheel.

Preferably, the yoke is symmetric whereby the projector can be mounted on either side thereof, for projection of the beam along either side of the vehicle, for measurement on either side.

Further, the means of connecting the projector onto the yoke is preferably adapted to reverse the direction of projection of the beam for alignment measurement of both a front wheel and a rear wheel.

To help understanding of the invention, a specific embodiment thereof will now be described by way of example and with reference to the accompanying drawings, in which.

Figure 1:
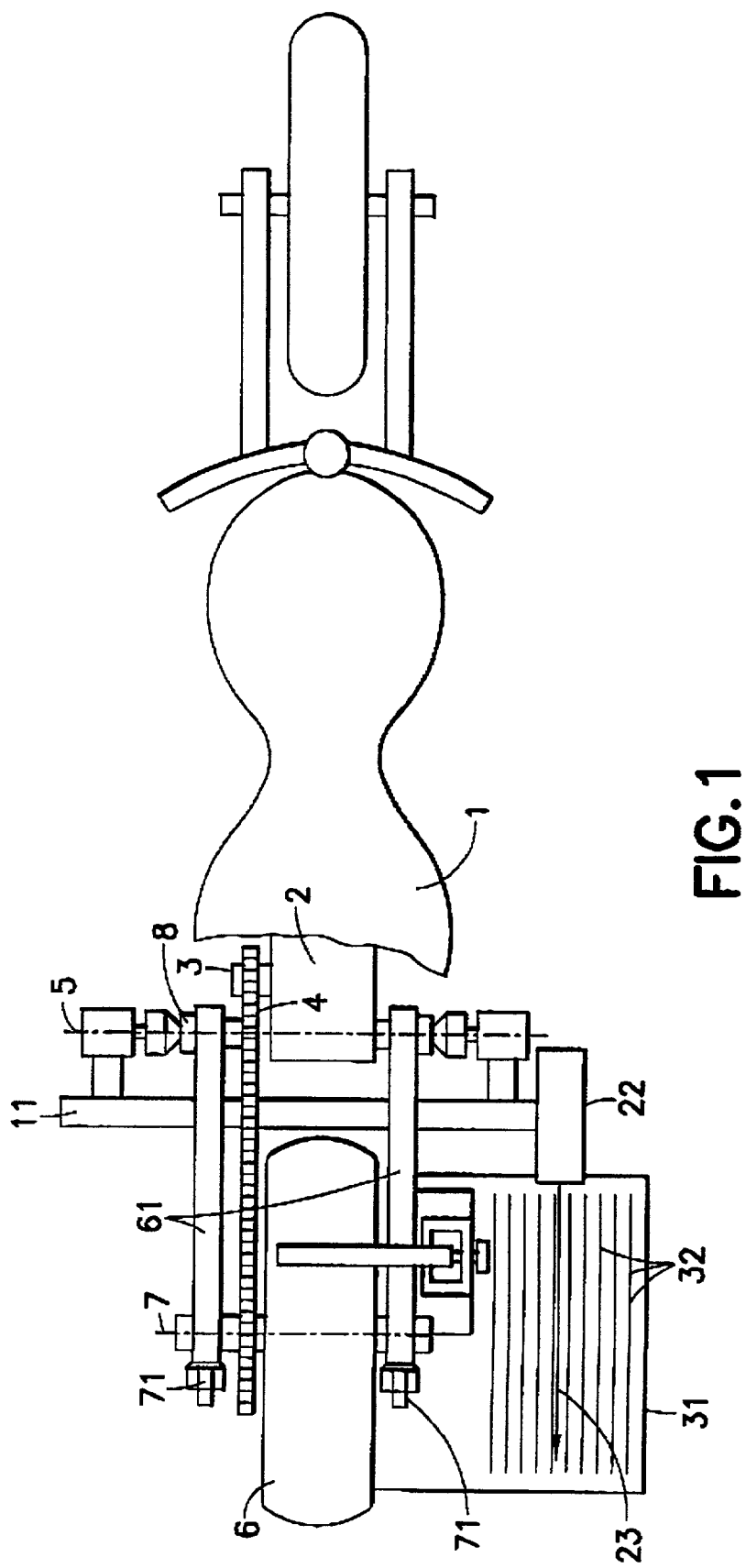
FIG. 1 is a plan view of a motorcycle with wheel alignment apparatus of the invention fitted to it.

Referring first to FIG. 1, the motor cycle thereshown has a frame 1 with an engine and gearbox 2 mounted in the frame such that the gearbox output shaft 3 carrying a drive sprocket 4 is parallel to an axis 5 about which the rear fork/swinging arm is pivoted to the frame. The rear wheel 6 is mounted on the swinging arm 61 with its axis 7 adjustable on the arm by means of adjusters 71, for chain tensioning. The shaft 3 and the swinging arm axis 5 are generally close o each other to avoid marked chain tension variations with wheel stroke. It is unlikely that the shaft 3 and the axis 5 will be out of parallel. However, the wheel axis 7 can be out of parallel with the shaft 3 & axis 5, either as a result of uneven adjustment from side to side or of more serious damage. Such misalignment is likely to increase chain wear and decrease the efficiency of power transmission.

The swinging arm spindle 8 as such, providing the pivot for swinging arm on the axis 5, is usually a hollow tube, open at both ends.

Figure 2:
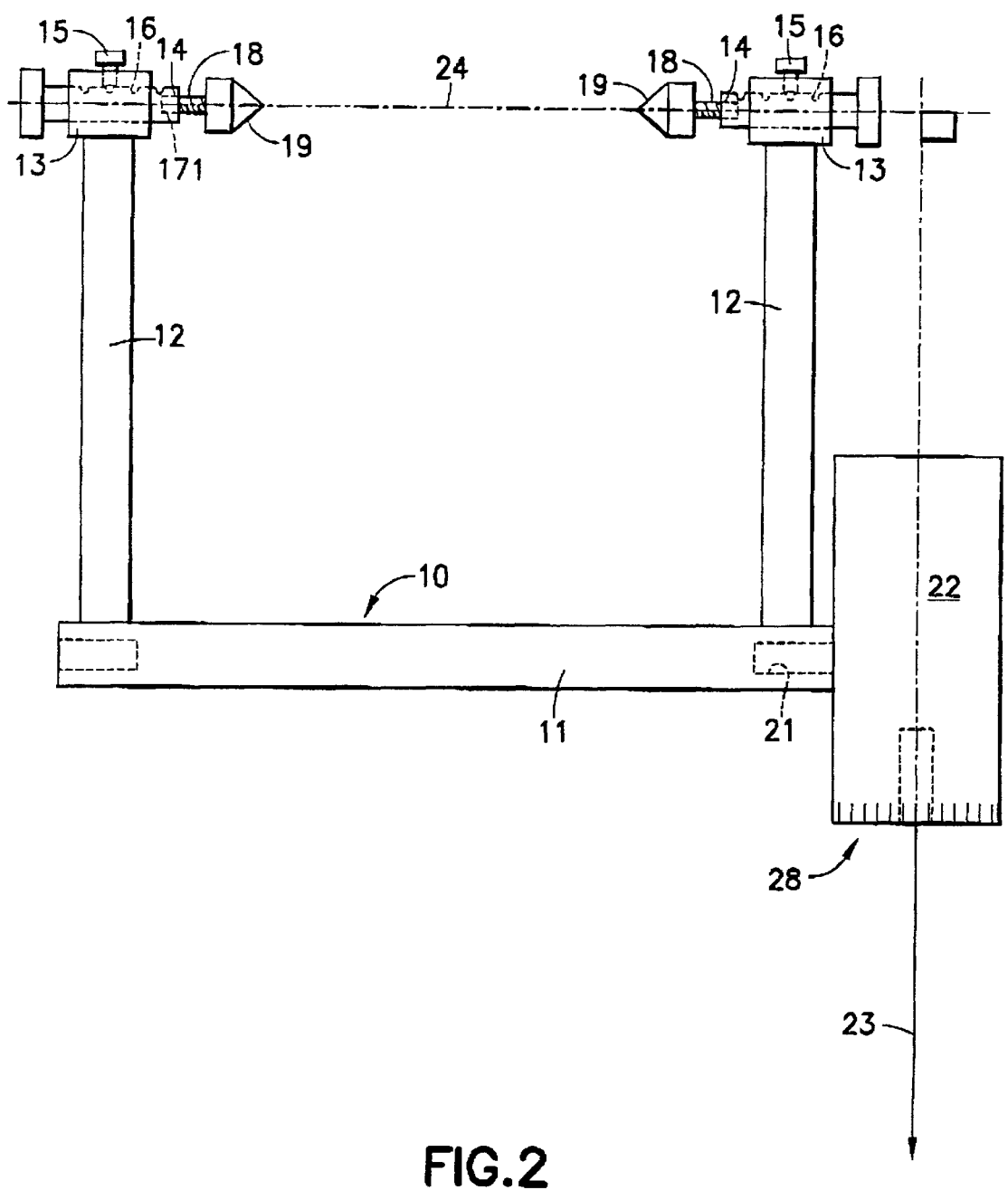
FIG. 2 is a plan view of a yoke and beam projector of the apparatus—laid flat.

The apparatus of the invention shown in FIGS. 1 and 2 includes a three sided yoke 10, having a transverse member tube 11 and two arms 12. At the distal end of each arm is provided a bush 13 accommodating a stub shaft 14 movable parallel to the tube 11 between a number of positions defined by a grub screw 15 and a series of detents 16. The inner faces 17 of the stubs have threaded recesses 171 in which threaded studs 18 of center pin pieces 19 engage. The arrangement is such that the center pins can be judged to be equally set in from their respective ends of the tube 11.

Received in either end of the tube 11 is a peg 21 of a laser projector 22. The projector is arranged to project a planar beam 23 orthogonal to the transverse axis 24 defined by the pins 19. The projector can be rotated via its peg around the axis of the tube 11.

Figure 3:
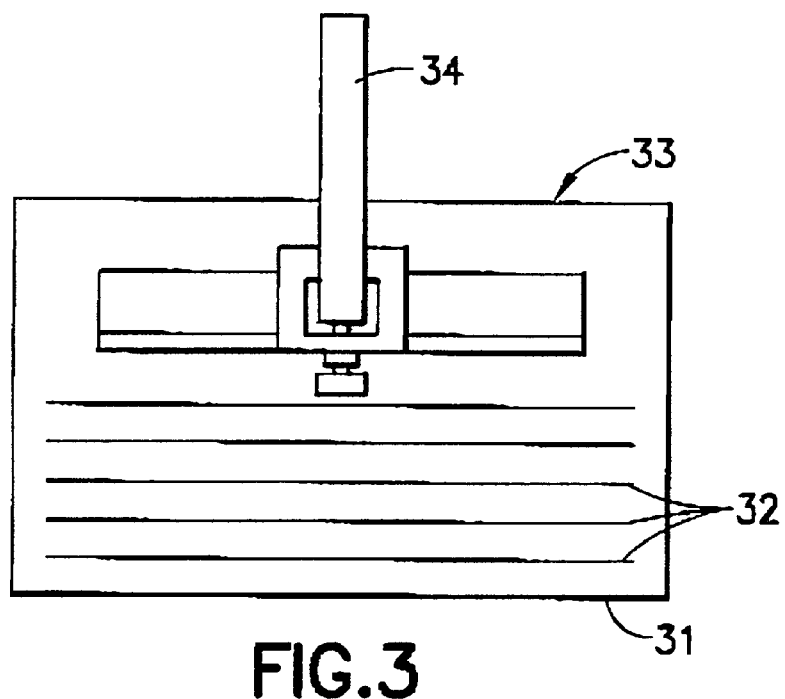
FIG. 3 is a plan view of a beam target of the apparatus.
Figure 4:
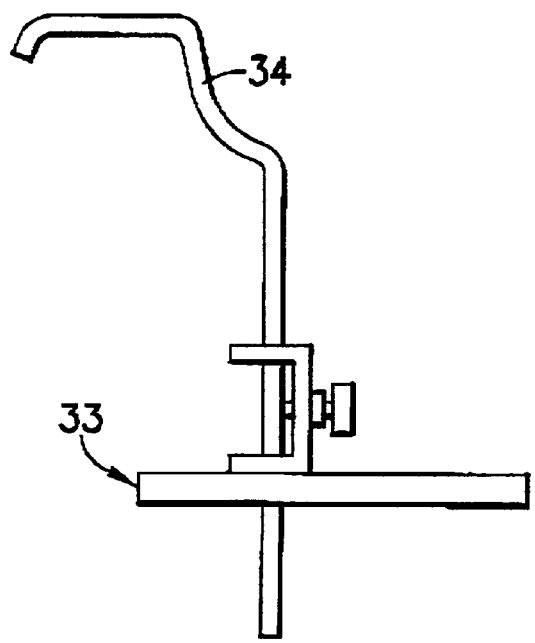
FIG. 4 is an end view of the beam target.

As shown in FIGS. 3 and 4, the apparatus includes a target plate 31 having a number of lines 32 printed on it. They are parallel to an edge 33 of the plate which is adapted to abut the tire of either wheel of the motor cycle. The edge may have pins for abutting the rim of the wheel, but in practice, a plain edge for abutting the tire has been found satisfactory. A hanger 34 is provided for hooking onto the top of the wheel with the plate arranged so that the laser beam 23 is visible along the plate.

In use, the center pins are engaged in opposite ends of the swinging arm spindle 8, whereby the tube 11 is hung from it and parallel to it. The beam is thus orthogonal to the axis 5 of the spindle. If the wheel axis 7 is parallel to the spindle axis, the beam 23 will cross the plate 31 parallel to the lines 32, as shown in FIG. 1. If it is not, it is a simple matter for the wheel to be adjusted on the swinging arm until the beam crosses the plate parallel with the lines, that is parallel with the side plane of the wheel and at right angles to the wheel axis.

The wheel can be checked for true alignment by making the above measurement at several angular positions of the wheel. If the swinging arm has suffered damage, the wheel can still be set up with its axis parallel with the swinging arm axis, yet with the chain running askew. This causes the chain to be out of parallel with the beam. It is a simple matter to measure the distance of the chain from the beam with a ruler extending out from the chain and impinged on by the beam. If this distance differs along the chain, it is askew and the swinging arm is damaged or at least the wheel requires to be adjusted laterally in the swinging arm.

By turning the projector forward and making measurements in the manner of the chain measurements on both sides, the front forks can be measured to be steered straight ahead. The target plate can then be hung on the front wheel to check that it is steered straight ahead when the forks are steered straight ahead. If there is a discrepancy, the front forks and/or the front wheel is damaged.

Other vehicles whose wheel alignment can be measured with the apparatus are so called ATVs (All Terrain Vehicles).

What is claimed is:

1. Apparatus for measuring wheel alignment of a vehicle which has a transverse axis and a longitudinal axis, comprising:
   - a yoke having a pair of aligned centre pins engageable with the vehicle along the transverse axis of the vehicle;

a collimated beam projector connectable to the yoke and adapted to project its beam at a right angle to the transverse axis, and parallel to the longitudinal axis of the vehicle; and a target for the beam, the target being so attachable to a wheel of the vehicle that alignment of the wheel can be measured.

2. Apparatus for measuring vehicle wheel alignment as claimed in claim 1, wherein the target is a reflector having a mirror arranged parallel to the axis transverse of the wheel, for reflecting the beam back to the projector.

3. Apparatus for measuring a vehicle wheel alignment as claimed in claim 2, wherein the projector is provided with a transverse scale (28).

4. Apparatus for measuring a vehicle wheel alignment as claimed in claim 1, wherein the target includes means for visualizing whether the projected beam is parallel to the longitudinal axis of the vehicle.

5. Apparatus for measuring a vehicle wheel alignment as claimed in claim 4, wherein the visualization means comprises a set of scale lines on a plate having abutments adapted to cause the lines to be parallel to the longitudinal axis of the wheel.

6. Apparatus for measuring a vehicle wheel alignment as claimed in claim 5, wherein the plate is clamped to the wheel.

7. Apparatus for measuring a vehicle wheel alignment as claimed in claim 5, wherein the plate is hung on the wheel.

8. Apparatus for measuring a vehicle wheel alignment as claimed in claim 1, wherein the yoke is symmetric whereby the projector can be mounted on either side thereof, for projection of the beam along either side of the vehicle, for measurement on either side.

9. Apparatus for measuring a vehicle wheel alignment as claimed in claim 1, wherein a means of connecting the projector onto the yoke is adapted to reverse the direction of projection of the beam for alignment measurement of both a front wheel and a rear wheel.

* * * * *

UNITED STATES PATENT AND TRADEMARK OFFICE
CERTIFICATE OF CORRECTION

PATENT NO. : 6,543,145 B2
DATED : April 8, 2003
INVENTOR(S) : Lovesy

It is certified that error appears in the above-identified patent and that said Letters Patent is hereby corrected as shown below:

<u>Column 1,</u>
Line 34, "Conventionally" should be -- Conveniently --
Line 64, "o" should be -- to --

Signed and Sealed this

Sixth Day of January, 2004

JAMES E. ROGAN
*Director of the United States Patent and Trademark Office*